US005907365A

United States Patent [19]

Nishigaki et al.

[11] Patent Number: 5,907,365

[45] Date of Patent: *May 25, 1999

[54] TELEVISION DEVICE

[75] Inventors: Tetsuo Nishigaki; Yukari Kohashi, both of Kanagawa; Naoyuki Kinebuchi, Saitama, all of Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/595,170

[22] Filed: Feb. 1, 1996

[30] Foreign Application Priority Data

Feb. 3, 1995 [JP] Japan .................................... 7-039249

[51] Int. Cl.[6] .............................. H04N 7/00; H04N 11/00

[52] U.S. Cl. ............................. 348/460; 348/461; 386/86

[58] Field of Search .................................... 348/460, 461, 348/465, 468, 553; 386/46, 86; H04N 7/00, 11/00

[56] References Cited

U.S. PATENT DOCUMENTS

| | | | |
|---|---|---|---|
| 4,977,455 | 12/1990 | Young | 348/460 |
| 5,453,793 | 9/1995 | Kim | 348/460 |
| 5,500,741 | 3/1996 | Baik et al. | 348/460 |
| 5,552,833 | 9/1996 | Henmi et al. | 348/460 |
| 5,557,585 | 9/1996 | Hanai et al. | 368/43 |
| 5,661,526 | 8/1997 | Hamamoto et al. | 348/465 |
| 5,668,915 | 9/1997 | Baik et al. | 386/46 |

FOREIGN PATENT DOCUMENTS

| | | | |
|---|---|---|---|
| 0492298 | 1/1992 | European Pat. Off. | H04N 5/782 |
| 0 661 879 | 7/1995 | European Pat. Off. . | |

OTHER PUBLICATIONS

IEEE Transactions On Consumer Electronics, vol. 37, No. 4, Nov. 1, 1991, pp. 737–745, XP000275983 Wilson E J.: "Programme Delivery Control For Simplified Home Video Recording" p. 740, col. 1, line 34—p. 742.

Image Technology (Journal of the BKSTS), vol. 76, No. 6, Jul. 1, 1994, pp. 122–124, XP000444744, Green N W: "PDC (Programme Delivery Control)" p. 122, col. 1, line 37—p. 123.

*Primary Examiner*—Chris Grant
*Assistant Examiner*—Vivek Srivastava
*Attorney, Agent, or Firm*—Frommer Lawrence & Haug LLP; William S. Frommer

[57] ABSTRACT

Identification codes of broadcasting stations which transmit the correct time information are recorded in broadcasting station tables, if a broadcasting station identification code in the broadcasting station tables is found in VPS or Teletext in the received broadcasting signal, the time information in the broadcasting signal is set to the clock. If the time information does not include year, month, and day data, the correct year, month, and day data is calculated based on the time information including year, month, and day data items from another broadcasting station, and the time information is used to set the time to the clock. The correct year, month, and day data are calculated based on the time difference between the time information from another broadcasting station and the time information comprising correct hour, minute, and second data.

4 Claims, 18 Drawing Sheets

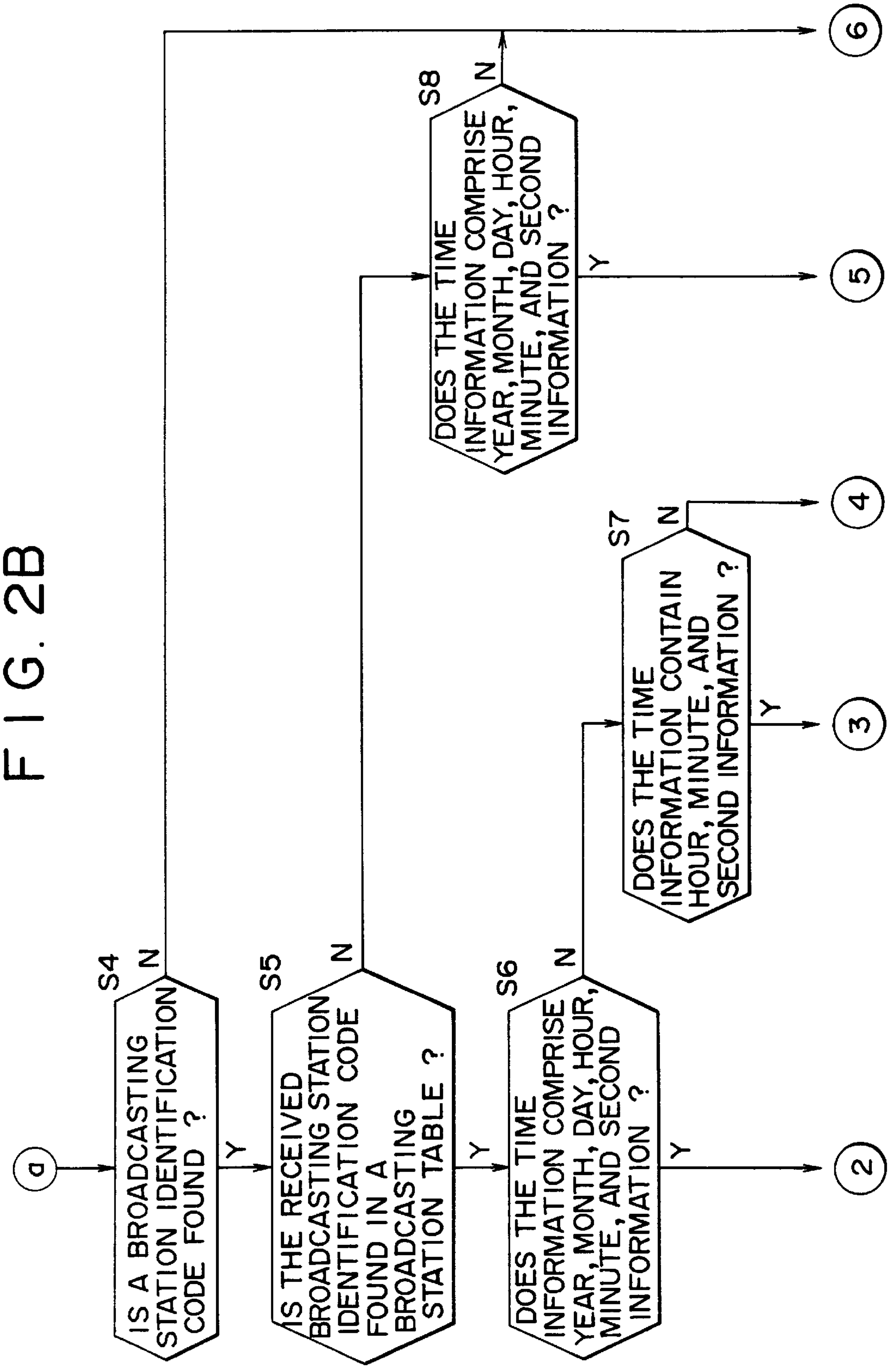
F I G. 2B

| AREA : UNITED KINGDOM |
|---|
| BROADCASTING STATION IDENTIFICATION CODE |
| 4701 |
| 4601 |
| 4602 |

FIG. 4(1)

| AREA : FINLAND |
|---|
| BROADCASTING STATION IDENTIFICATION CODE |
| 4701 |
| 4601 |
| 4602 |

FIG. 4(2)

| AREA : NORTH EUROPE |
|---|
| BROADCASTING STATION IDENTIFICATION CODE |
| 4701 |
| 4601 |
| 4602 |

FIG. 4(3)

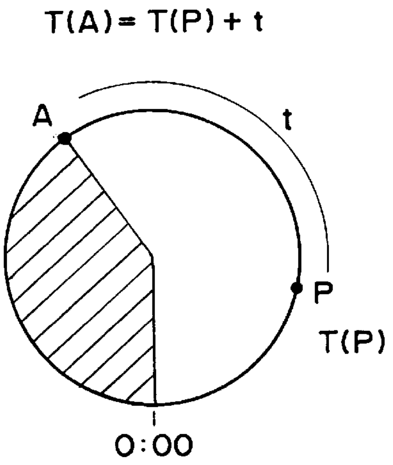
FIG. 8
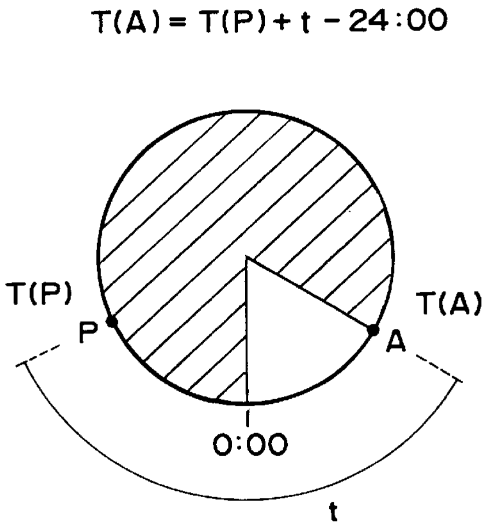
FIG. 8
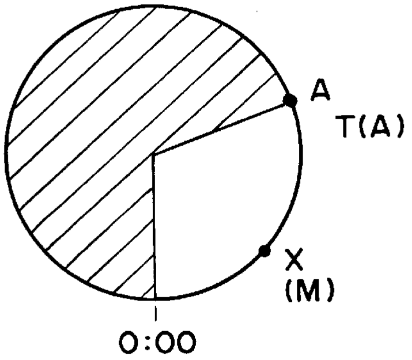
FIG. 8

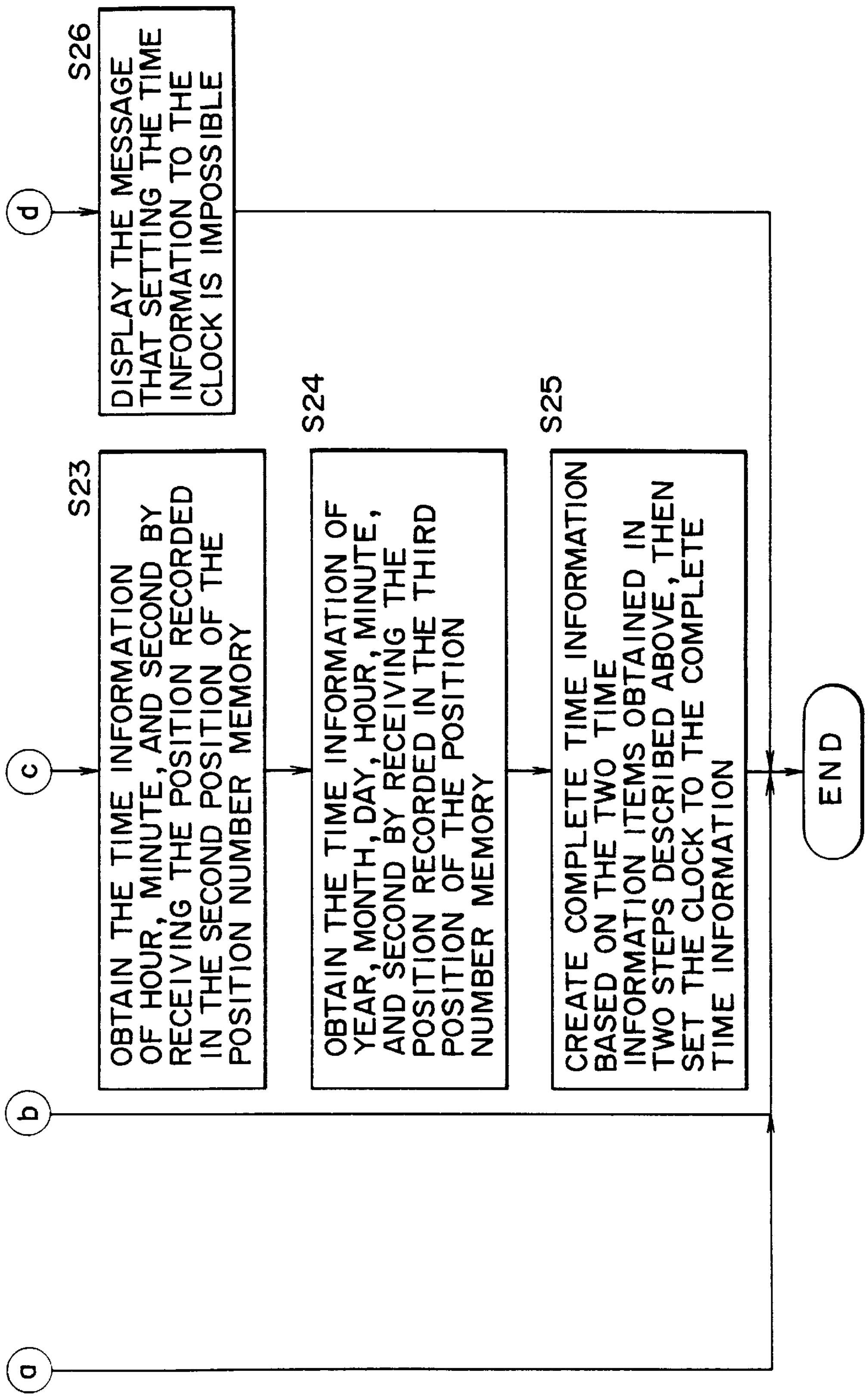
F I G. 10B

CNI : COUNTRY AND NETWORK IDENTIFICATION
PIL : PROGRAM IDENTIFICATION LABEL
PTY : PROGRAM TYPE

[ VPS ]

[ PAGE - HEADER FORMAT ]

TELEVISION DEVICE

BACKGROUND OF THE INVENTION

1. Field of the Invention

This invention relates to a television device having a clock, and particularly relates to television device which is possible to set the clock to the time using the present time information included in television broadcasting signals.

2. Description of Related Art

Many clocks are provided in devices in a television to provide various conveniences in the use of a television. One example of such a convenience includes an advanced recording reservation system of a video tape recorder. A clock is provided in a video tape recorder, when a user want to record by advanced reservation the user feeds data of a channel which will broadcast a television program to be recorded and data of time when the program will start and end previously in the video tape recorder, and the video tape recorder will automatically record the reserved television program beginning from the start of the program to the end of the program based on chronometry by the clock. Some video tape recorders are structured so that regeneration operation starts automatically at the time of advanced starting reservation and stops automatically at the time of advanced stopping reservation.

In European television broadcasting, a broadcasting service, in which the starting time of a television program is interpolated in vertical interval time code as an identification code of a television program (the program identification code is referred to as a label) now being broadcasted, is practically used, and a technology in which the above mentioned label is used for advanced program reservation has been established for recording systems such as video tape recorders. More in detail, the recording system compares a label interpolated in broadcasting signal of a reserved channel with broadcast starting time data out of the advanced program recording reservation data fed by a user including data of the channel to be recorded and data of broadcast starting time data and broadcast ending time, and then the recording system operates recording during a period while the label agrees with the starting data.

Various broadcasting services, for which these advanced recording reservation technology is acceptable, such as Video Program System (called VPS hereinafter), in which the label is interpolated in the line 16 in a vertical interval time code applied in Germany, Switzerland, and Austria, and Program Delivery Control (referred to PCD hereinafter), in which a label is transmitted by using packet 8/30/format 2 of Teletext applied in the Netherlands and Dutch using area of Belgium, are practically used.

Here, Teletext is described briefly. In Teletext, data of a magazine is transmitted using packets from 0 through 29. Only magazine number 8 has packets from 0 through 30, the packet 8/30 includes not only the packet 8/30/format 2 but also packet 8/30/format 1, this type of packet is transmitted about every one second interval as service data packet of a broadcasting station. Packet X/O is defined as Page-Header of the Teletext.

For reference, signal formats of VPS, 8/30/format 2, 8/30/format 1, and Page-Header are illustrated in FIG. 11 to FIG. 14. As obvious in these figures, the label information is included in data areas in bytes from eleventh byte to thirteenth byte in the case of VPS, and other data including CNI data that is an identification code of broadcasting area and broadcasting station are transmitted.

The label information is included in data area of bytes from sixteenth byte to twenty-first byte and, the label information and also CNI data same as VPS signal are transmitted in the case of 8/30/format 2. Present time information comprising years, months, days, hours, minutes, and seconds is included in data area of bytes from fifteenth byte to twenty-first byte in the case of 8/30/format 1, and in data area of bytes from thirteenth byte to fourteenth byte NI code that is the identification code of a broadcasting station is included. In many cases for Page-Header, data area of bytes from thirty eighth byte to forty fifth byte includes the present time information comprising hours, minutes, and seconds.

The recording system applied with advanced recording reservation technology utilizing label system as described herein above is provided with a switching system in preparation for troubles such as intermittent transmission of label. In the event that the broadcasting station happens to be involved in a trouble and can not transmit the label signal, the advanced recording reservation operation of the recording system is switched based on the time of a clock in the recording system by transmitting a prescribed control signal from the broadcasting station so that the recording system records during the period of time from the programmed starting time to the programmed ending time of the television program which had been set by a user.

By the way, to operate accurately a recording based on the time of the clock, as a matter of cause, it is required that the clock is set to the correct time signal. To keep a clock in correct time, conventionally in the event of failure of power supply or of newly supplying of power to a recording system by putting a power supply plug of the recording system in a socket for commercial power supply, every time it is required to set the clock to the correct time. However, it is troublesome to set a clock to the correct time for users.

To eliminate the troublesome time setting, an automatic time setting method in which present time information included in television broadcasting signals as described in the above mentioned Teletext is utilized has been known.

When a clock incorporated in a television system is set to the correct time automatically as described herein above, it is required to select a broadcasting station which transmits television broadcasting signals interpolated with the correct present time information in the area where the television system is used.

However, depending on the area, some broadcasting stations transmit the correct present time information, though the time information could be not the full time information but the time information including only hours, minutes, and seconds as Page-Header described herein above, in such case the correct time data of years, months, and days cannot be set to the clock automatically, it is a problem. Otherwise, even in the case that the time information includes full data of years, months, days, hours, minutes, and seconds, in an area where the standard time is different from that of the transmission, the time data of only years, months, and days is acceptable, further, in an area where the date is different due to the difference in time from that of the transmission, no time data of years, months, days, hours, minutes, and seconds can be used.

Conventionally, automatic time setting to the clock has not been used in areas where they can receive only such defective time information, and only in areas where they can receive correct perfect time information of years, months, days, hours, minutes, and seconds, the automatic time setting to the clock has been accommodated using the time information interpolated in broadcasting signals.

SUMMARY OF THE INVENTION

The present invention provides a television device provided with receiving means for receiving television broadcasting signals, selecting means for selecting a broadcasting signal broadcasted from a desired broadcasting station from television broadcasting signals received by the receiving means, extracting means for extracting a broadcasting station identification code and the present time information interpolated in the selected broadcasting signal, a clock, and clock setting means for setting the correct time to the clock, wherein the clock setting means judges whether the time represented by the present time information extracted from the broadcasting signal is the same as the time in the area where a television device is placed and judges whether information on years, months, and days is included in the present time information referring to the broadcasting station identification code extracted from the broadcasting signal by the extracting means, and based on the resultant judgment, determines whether the present time information is to be used as the time information for setting the time to the clock.

The clock setting means is structured so as to, based on two present time information items, one is the first present time information including the same time data as that in the area where the television device is placed but not including information on years, months, and days, and another is the second present time information including information on years, months, and days but including the different time data from that in the area where the television device is placed, composes time information for setting the time to the clock comprising information on years, months, days, hours, minutes, and seconds.

It is convenient that the television device is provided with memory means comprising a nonvolatile memory element, and the clock setting means stores the identification code of a broadcasting station transmitting television broadcasting signals with interpolation of the present time information which is determined to be used as the time information for setting the time to the clock by the clock setting means in the memory means.

Data transmitted through Teletext is preferably used as the present time information.

A broadcasting station, transmitting the present time information for setting time to the clock, is automatically determined.

Based on two present time information items, one is the first present time information including the same time data as that in the area where the television device is placed but not including information on years, months, and days and another is the second present time information including information on years, months, and days but including the different time data from that in the area where the television device is placed, time information for setting the clock to the time comprising information on years, months, days, hours, minutes, and seconds is composed.

An identification code of the broadcasting station used for clock setting is stored in memory means comprising a nonvolatile memory element, and the recorded broadcasting station identification code is used repeatedly.

BRIEF DESCRIPTION OF DRAWINGS

FIGS. 2A and 2B denote respective portions of FIG. 2.

FIG. 3 is another partial flow chart for determining the time to be set to the clock in the embodiment.

FIG. 4 is an example of data content included in broadcasting station tables in the embodiment.

FIG. 8 is a diagram for illustrating the method to determine a correct data based on the positional relation between the area of the broadcasting station, receiving place, and date line.

FIG. 10 is a flow chart for illustrating a flow for resetting the time to the clock in the embodiment.

FIGS. 10A and 10B denotes respective portions of FIG. 10.

DETAILED DESCRIPTION OF THE PREFERRED EMBODIMENTS

Figure 1:
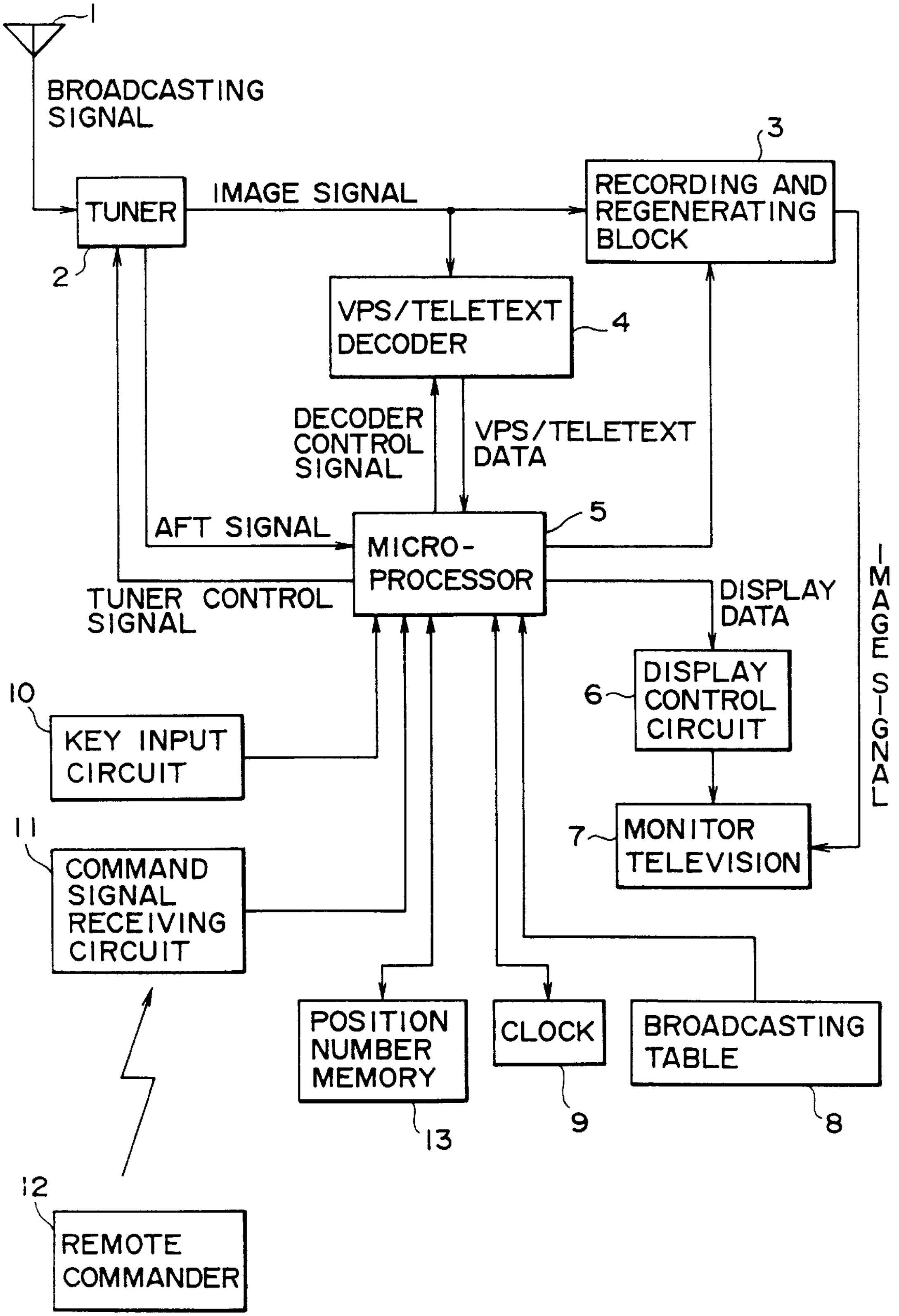
FIG. 1 is a circuit block diagram for illustrating an embodiment of the television device in accordance with the present invention.

An embodiment of a television device in accordance with the present invention is shown in FIG. 1. In this embodiment, broadcasting signals are received by an antenna 1 and fed to a tuner 2 to select signals of a desired broadcasting station, and an image signal, which is a demodulated output of the received broadcasting signal, is fed to a recording and regenerating block 3 for recording, an image signal regenerated in the recording and regenerating block 3 is fed to a monitor television 7 for displaying a picture, or an image signal from the tuner 2 is fed to the monitor television 7 without passing through a recording and regenerating circuit in the recording and regenerating block for displaying a picture, a microprocessor 5 controls the whole system.

A clock 9 in this embodiment is provided to control the recording operation and the regeneration operation in the recording and regenerating block 3 and the displaying operation in the monitor television 7 depending on time, and to display the time for convenience of users, the time of the clock 9 is set automatically using the present time information included in Teletext. The microprocessor 5 is provided externally with the broadcasting station tables 8 and the position number memory 13 for using when time setting to the clock.

Next, detailed processes for time setting and the flow of the microprocessor 5 are described in detail.

First, a user transmits a menu displaying command to the television device of the embodiment using a remote commander 12. The microprocessor 5 receives the command from a command signal receiving circuit 11, then, fed menu display data to a display control circuit 6. The display control circuit 6 converts this data to a video signal and fed it to the monitor television 7, and consequently a menu picture is displayed. The user selects the area (country) selection menu from the displayed menu, and select the area (country) where the user is living, thus, the selected area (country) is stored in the microprocessor.

Next, the user displays again the menu picture on the monitor television 7 using the remote commander 12, and selects the menu for time setting. Thereby, the microprocessor 5 operates the flows shown in FIG. 2 and FIG. 3 for time setting.

In detail, the microprocessor 5 clears at first a position number memory 13, thereafter, sets the minimum position number on the memory as the first selected position number (steps S1 and S2), and sends a tuner control signal to the tuner while reading AFT signal from the tuner 2 so as to select this position number (step S3).

After completion of channel selection, an image signal generated from the tuner is fed to a decoder 4 of VPS or Teletext, the obtained decoder output is checked (step 4) to find CNI data which is the identification code of broadcasting stations in VPS or 8/30/format 2 as described hereinbefore or NI data which is the identification code of broadcasting station in 8/30/format 1.

Figure 3A:
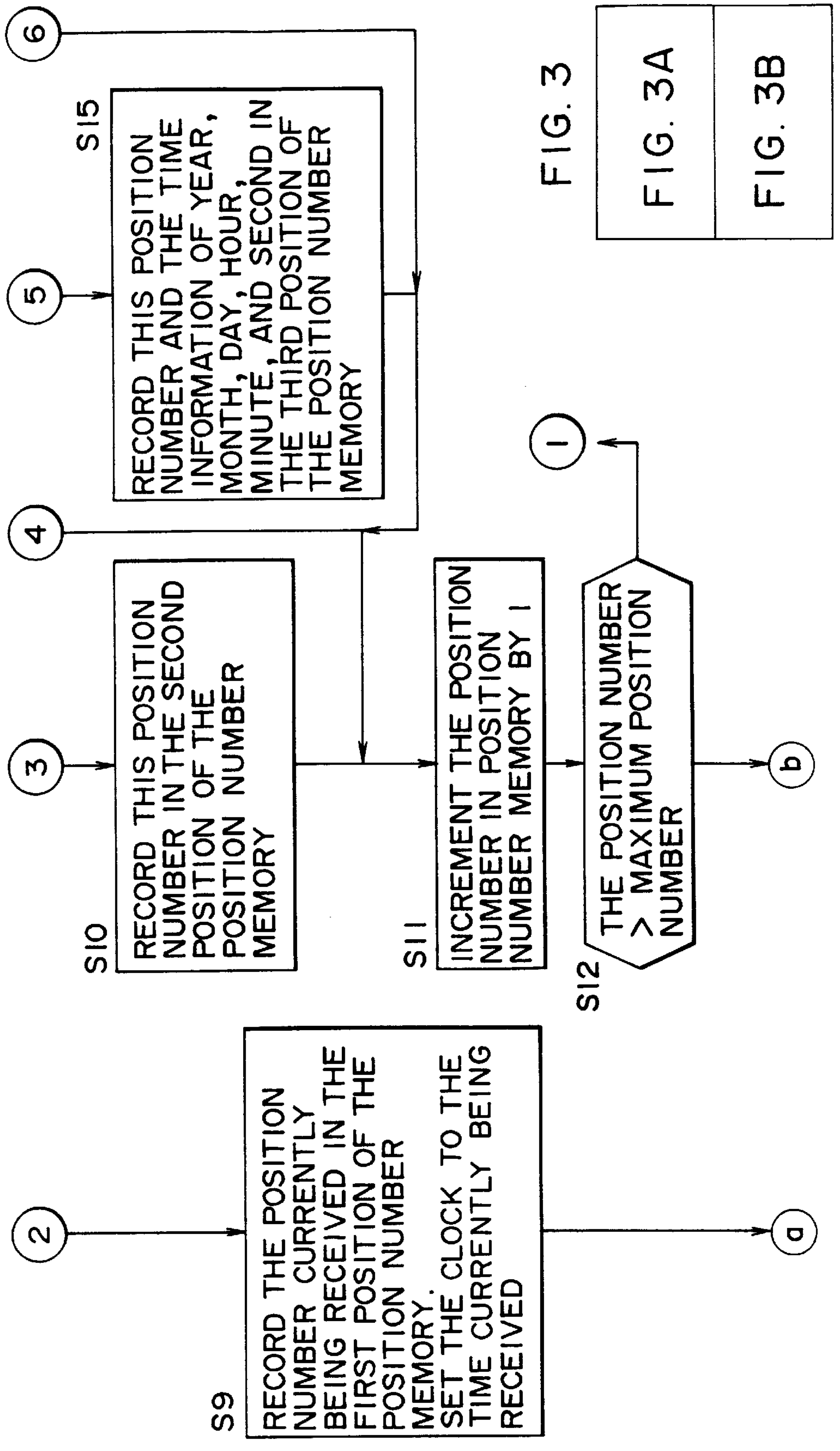
FIGS. 3A and 3B denote respective portions of FIG. 3.
Figure 3B:
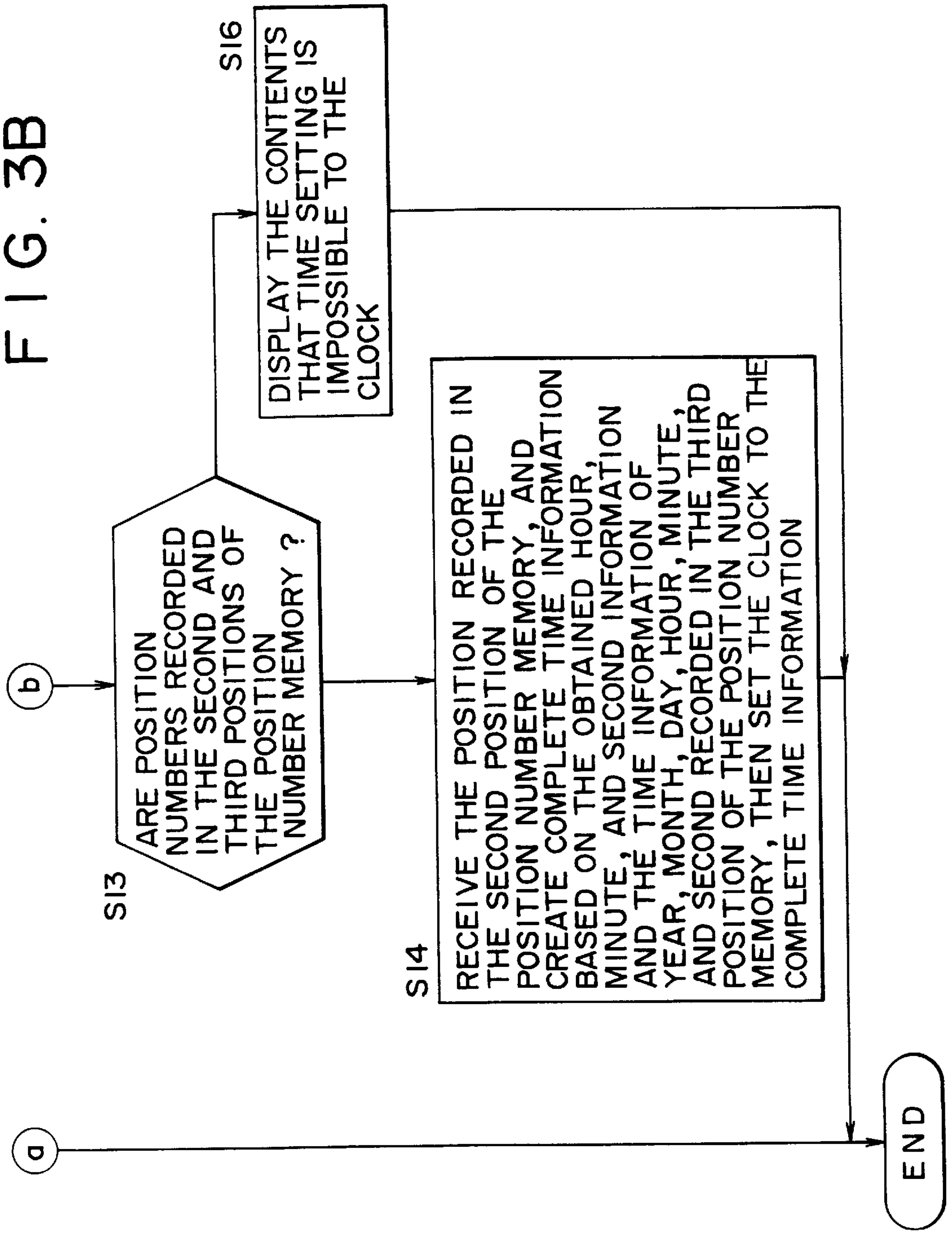

On the other hand, in a broadcasting station table 8 in the television device as shown in FIG. 3, for example, broadcasting station codes (in detail, broadcasting station codes represented as CNI data or NI data) of broadcasting stations which are transmitting the correct present time information using Teletext are stored in the memory by area for example as shown in FIG. 4, the microprocessor 5 searches (step S5) the broadcasting station table of the area selected and stored using the above mentioned menu when the resultant judgment is YES in the step S4 to find (step S5) the identification code of the broadcasting station found in the step S4.

When the identification code is found in the table, the microprocessor reads the time information from the decoder 4, and if the time information includes year, month, day, hour, minute, and second data, the microprocessor operates time setting to the clock using this time information and records (step S6 and step S9) the position number currently being received in the first position of the position number memory, thus this time setting operation is completed.

On the other hand if the resultant judgment is NO in the step S6, that is, the time information includes only hour, minute, and second data, the position number which is being received is recorded (step S10) in the second position of the position number memory, thereafter the value of the position number to be selected is increased by "one" (step S11), and this process returns to the step S3 through a judgment in the step S12. If the judgment in the step S7 is NO, the process moves to the step S11 directly.

In the judgment in the step S5 the identification code of a broadcasting station which is being received is not found in the broadcasting station table, the step S8 judges whether the output from the decoder 4 includes year, month, day, hour, minute, and second data items. If the result is YES, the position number which is being received and the year, month, day, hour, minute, and second data items are recorded (step S15) in the third position of the position number memory, thereafter the process moves to the step S11 to prepare for receiving the next position number. If the judgment in the step S8 is NO, the process moves to the step S11 directly.

By providing the above mentioned flow comprising the step S1 to step S13, if the time information including year, month, day, hour minute, and second data is transmitted and a broadcasting station having the broadcasting station identification code recorded in a broadcasting station table is found in one of position numbers ranging from the minimum position number to the maximum position number, the position number of the broadcasting station is recorded in the first position of the position number memory in the step S9, and the clock is set using the time information which is transmitted by the broadcasting station.

If the broadcasting station is not found, a loop comprising the step S3 to step S12 is operated repeatedly from the minimum position number to the maximum position number, thereafter, the step 13 checks whether position numbers are recorded in the second and third positions of the position number memory, and if the position number is recorded, the position number recorded in the second position of the position number memory is received, and a complete time data is composed using the time data obtained from the received signal and year, month, day, hour, minute, and second data recorded in the third position of the position number memory, then the complete time data are set to the clock (step S15).

If the judgment in the step S13 is NO, a notice of impossible time setting to the clock is displayed to the user(step S16), and the process is brought to an end. In the above mentioned flow, a structure in which year, month, day, hour, minute, and second data are also recorded in the third position of the position number memory is employed, but in stead of such structure, another structure in which only a position number is recorded in the third position of the position number memory and the position number recorded in the third position of the position number memory is received in the step S14 to obtain year, month, day, hour, minute, and second data may be employed.

Next, preparation of a complete time data in the step S14 in FIG. 3 is described. For preparation of a complete time data, time information of hour, minute, and second data items obtained by receiving the position recorded in the second position of the position number memory may be used as it is, however for year, month, day data information, the year, month, day data obtained by receiving the third position of the position number memory can not be used as it is as a correct data.

A method for deriving correct year, month, and day data from year, month, and day data obtained by receiving the third position of the position number memory is described herein under.

Figure 5:
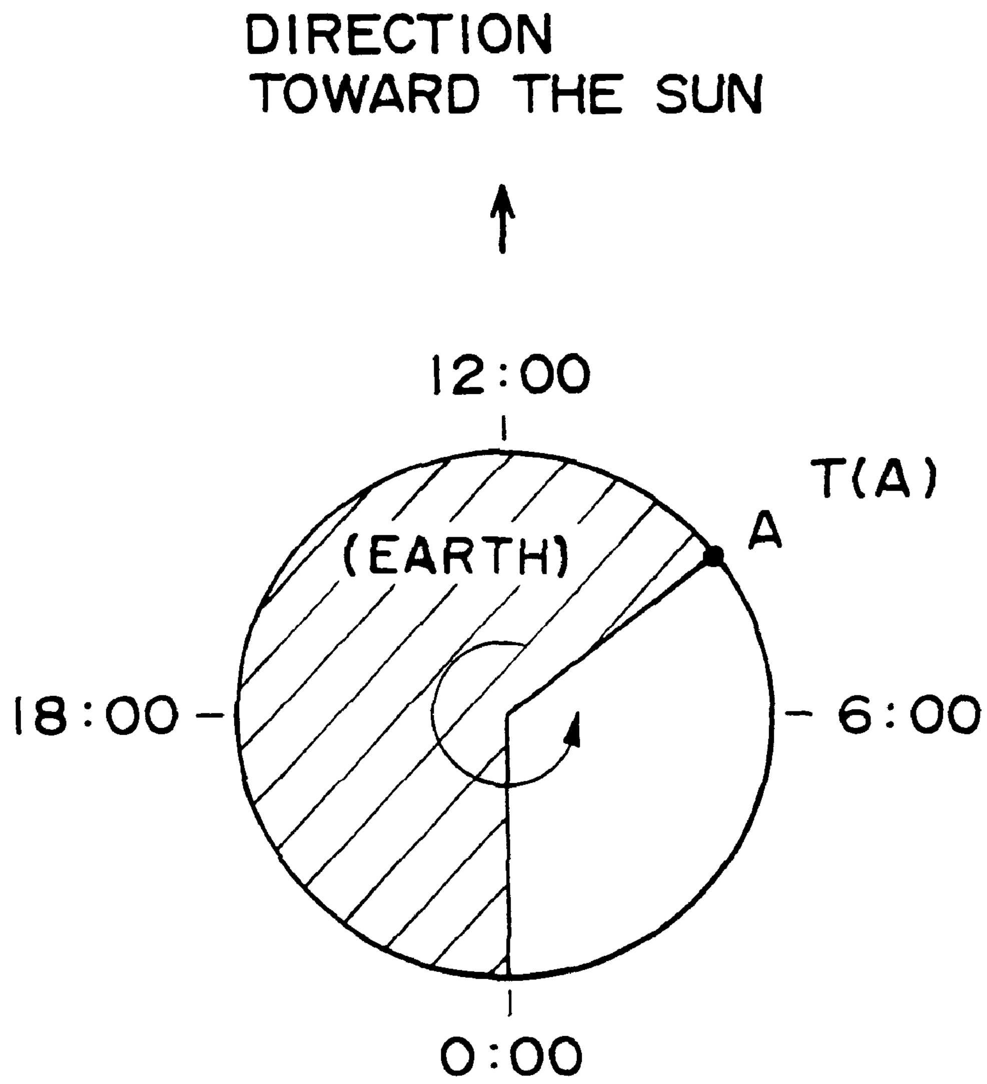
FIG. 5 is a diagram for illustrating the date line on the earth.

In FIG. 5, the relationship between the time at the date line on the earth and date is illustrated. In this figure, an arrow head represents the rotational direction of the earth, A represents the date line, and year, month, and day data out of year, month, day, hour, minute, and second data which represent the time at A is represented by T(A), then, the date in the area where the time ranges from 0 hours 00 minutes to T(A) proceeds one day ahead of the date in another area which is shaded (the former area is referred to as "ahead area" and the latter area is referred to as "behind area" hereinafter).

In this case in which the earth is divided to two areas as described above, depending on whether the area including the place (represented by place P) where a television device of the present invention is used is identical with the area including the place (represented by place X) which is suggested by the time information from the broadcasting station recorded in the third position of the position number memory, year, month, day data obtained by receiving the third position of the position number memory (namely, year, month, day data at the place X) is adjusted to obtain correct year, month, day data.

Figure 6:
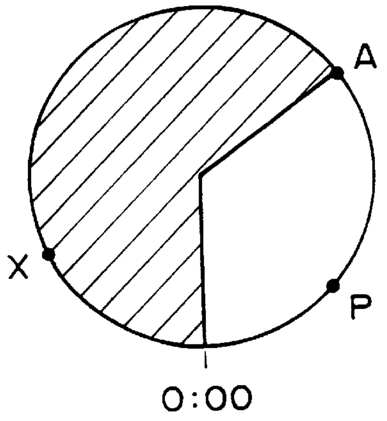
FIG. 6 is a diagram for illustrating relation patterns between the date line, area of the broadcasting station, and receiving place.
Figure 6:
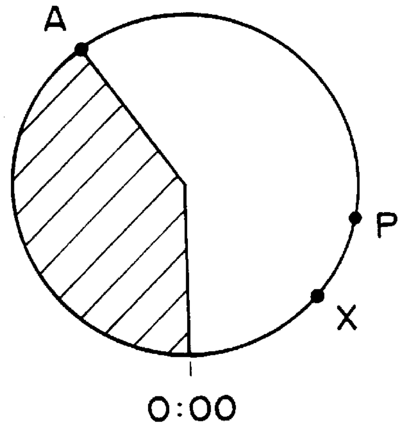
Figure 6:
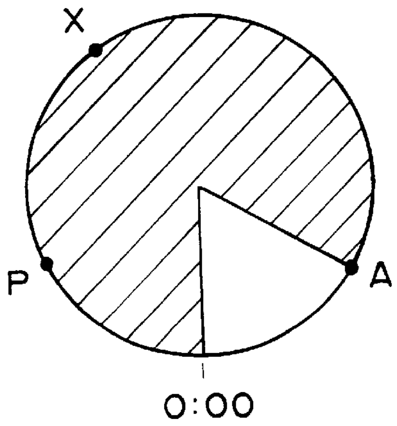
Figure 6:
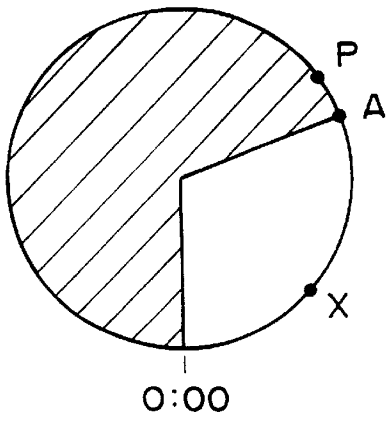

Depending on cases of couples comprising combinations of two areas of the ahead area and behind area and two places of P and X, there are four combination patters as shown in FIG. 6 ([1] to [4]). In the cases of [2] and [3] in which the place P and place X are in the same area, year, month, and day data at the place X is used as correct data as it is, and on the other hand, in a case of [1] in which the place P is in the ahead area and the place X is in the behind area, one day ahead data of year, month, and day data at the place X is used as correct data. In a case of [4] in which the place P is in the behind area and the place X is in the ahead area, one day behind data of year, month, and day data is used as correct data.

Figure 7:
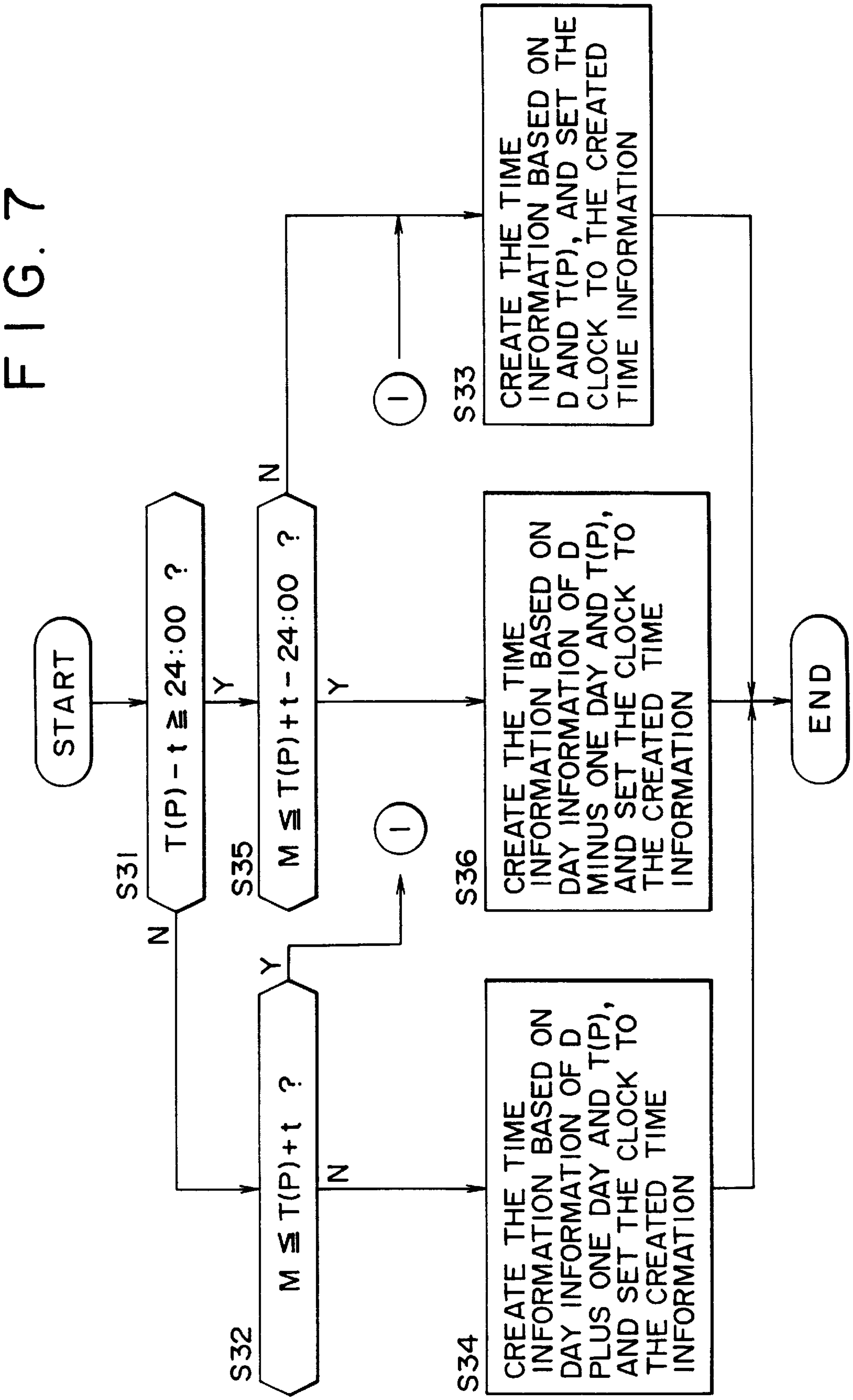
FIG. 7 is a flow chart for determining correct year, month, day, hour, minute, and second data in the embodiment.

A flow for preparing complete time information based on this principle is described referring to FIG. 7.

In FIG. 7, T(P) represents correct hour, minute, and second data at the place P obtained by receiving the position number recorded in the second position of the position number memory, and t represents the time difference (represented in the form of hour, minute, and second data). The time information obtained by receiving the position number recorded in the third position of the position number memory comprises two groups of hour, minute, and second data and year, month, and day data, and M represents the former data and D represents the latter data.

In this flow, first, the step S31 judges whether the place P is in the behind area or in the ahead area (as obvious from [1] and [2] in FIG. 8, if the place P is in the ahead area, hour, minute, and second data T(A) which represents the time at A is represented by T(P)+t, on the other hand, if the place P is in the behind area, T(P)+t shows a value larger than 24 hours 00 minutes, and T(A) is represented by T(P)+t−24 hours 00 minutes).

If the judgment is NO, the step S32 judges whether the place X is in the behind area or in the ahead area (in this case, it is judged that the value of T(P)+t is smaller than 24 hour 00 minute through the step S31, therefore, this value is used as it is as T(A). As it is obvious from [3] in FIG. 8, if M≦T(A) the place X is in the ahead area, and otherwise, the place X is in the behind area.). The judgment of NO suggests that the place X is in the behind area and the place P is in the ahead area, then, time information including data on months, days, hours, minutes, and seconds which is composed from one day ahead year, month, and day data and T(P) is set to the clock in the step S34 as the correct time information.

If the judgment in the step S32 is YES, it suggests that both place X and place P are in the ahead area, the time information of data on years, months, days, minutes, and seconds which is composed from D and T(P) is set in the clock as correct time information.

If the judgment in the step S31 is YES, the next step S35 judges whether the place X is in the behind area or in the ahead area (in this case, T(P)+t is larger than 24 hour 00 minute, therefore, T(P)+t−24 hours 00 minutes is used as T(A)). The judgment of YES suggests that the place X is in the ahead area and the place P is in the behind area, therefore, time information of data on years, months, days, hours, minutes, and seconds which is composed from one day behind date of D and T(P) is set in the clock as correct time information in the step S36.

The judgment of NO in the step S35 suggests that both place X and place P are in the behind area, therefore, the process moves to the step S33, and time information of data on years, months, days, hours, minutes, and seconds which is composed from D and T(P) is set to the clock as correct time information.

As described herein above, by using the flow shown in FIG. 7, complete time information is prepared not only in Europe but also other areas in the world when the television device is used. However, if the area where the television is used is limited to Europe and the vicinity of Europe, the position of the date line can be omitted from the consideration, then, the simple flow as shown in FIG. 9 is enough to prepare complete time information.

Figures 9, 9A:
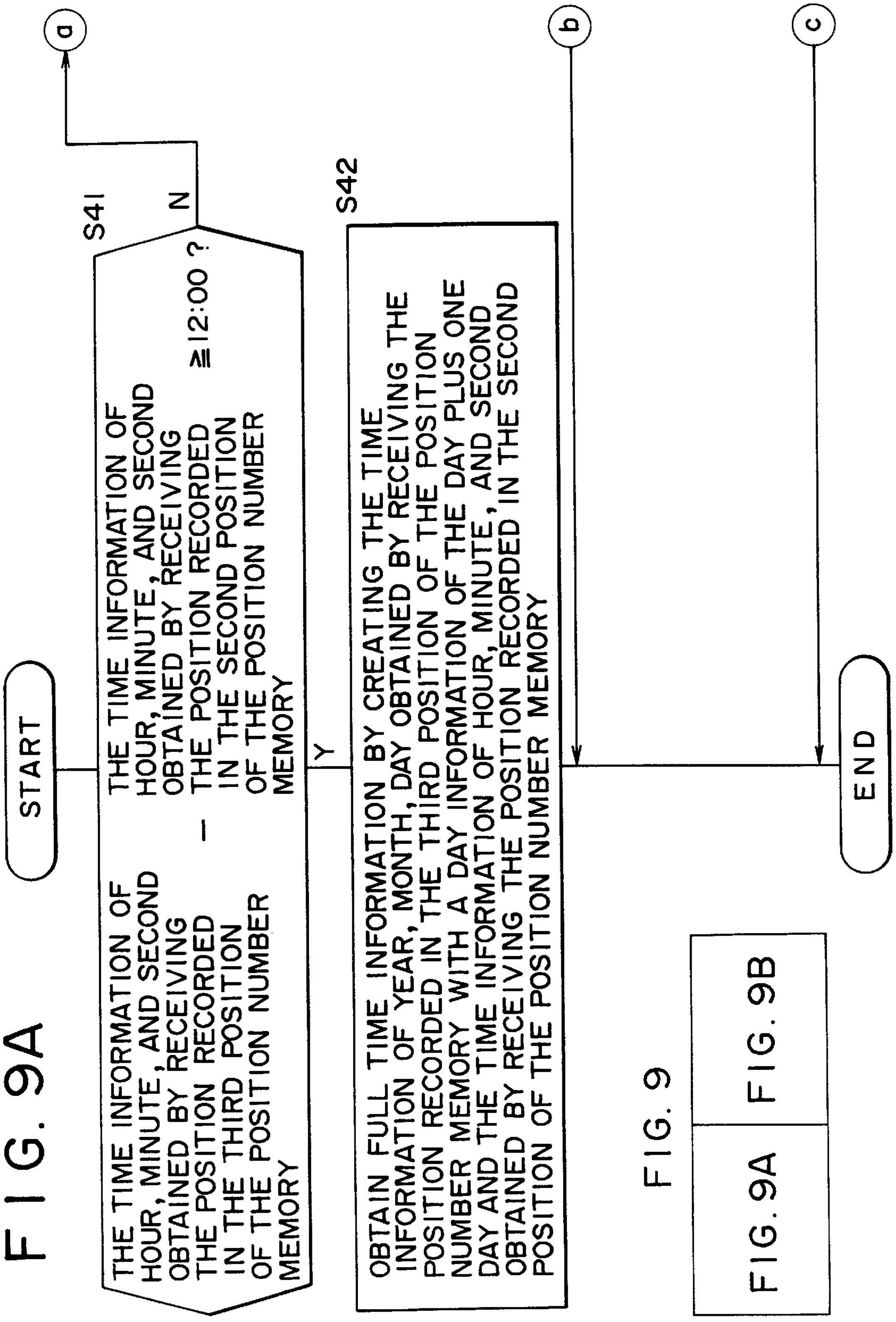
FIG. 9 is another flow chart for determining correct year, month, day, hour, minute, and second data in the embodiment.
FIGS. 9A and 9B denote respective portions of FIG. 9.
Figure 9B:
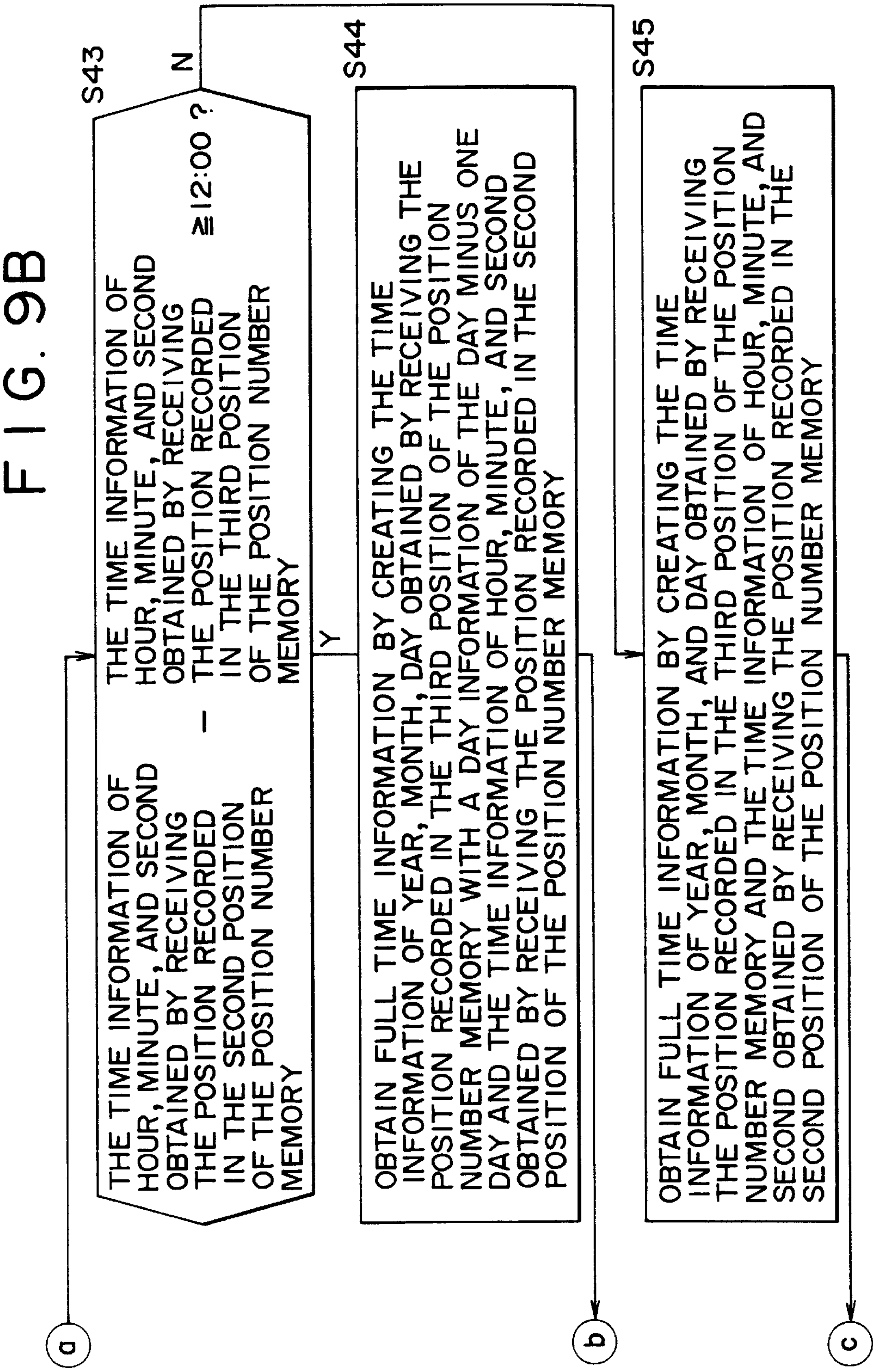

The flow shown in FIG. 9 is described briefly. In this flow, the date difference between areas near each other in Europe or vicinity of Europe is only the time near 0 hour 00 minute, and when, for hour, minute, and second data in the areas near each other, the time difference rapidly changes from a normal value of several hours to a value of as large as twenty hours, and utilizing this change the date is adjusted.

In detail, the step S41 and step 43 judges whether the time difference is larger than twelve hours, if the judgment is YES, complete time information is composed from the time information of one day ahead or behind date of year, month, and day data obtained by receiving the third position recorded in the position number memory and the time information of hour, minute, and second data obtained by receiving the second position recorded in the position number memory in the step S42 and step S44.

Otherwise, complete time information is composed from the time information of year, month, and day data obtained by receiving the position recorded in the third position of the position number memory and the time information of hour, minute, and second data obtained by receiving the position number recorded in the second position of the position number memory in the step S45. The value which is used as a criteria when the date is changed may be a value other than 12 hour, any desired value may be used.

Figure 2:
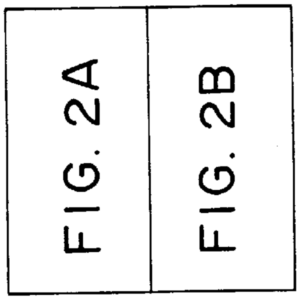
FIG. 2 is a partial flow chart for determining the time to be set to the clock in the embodiment.
Figure 2A:
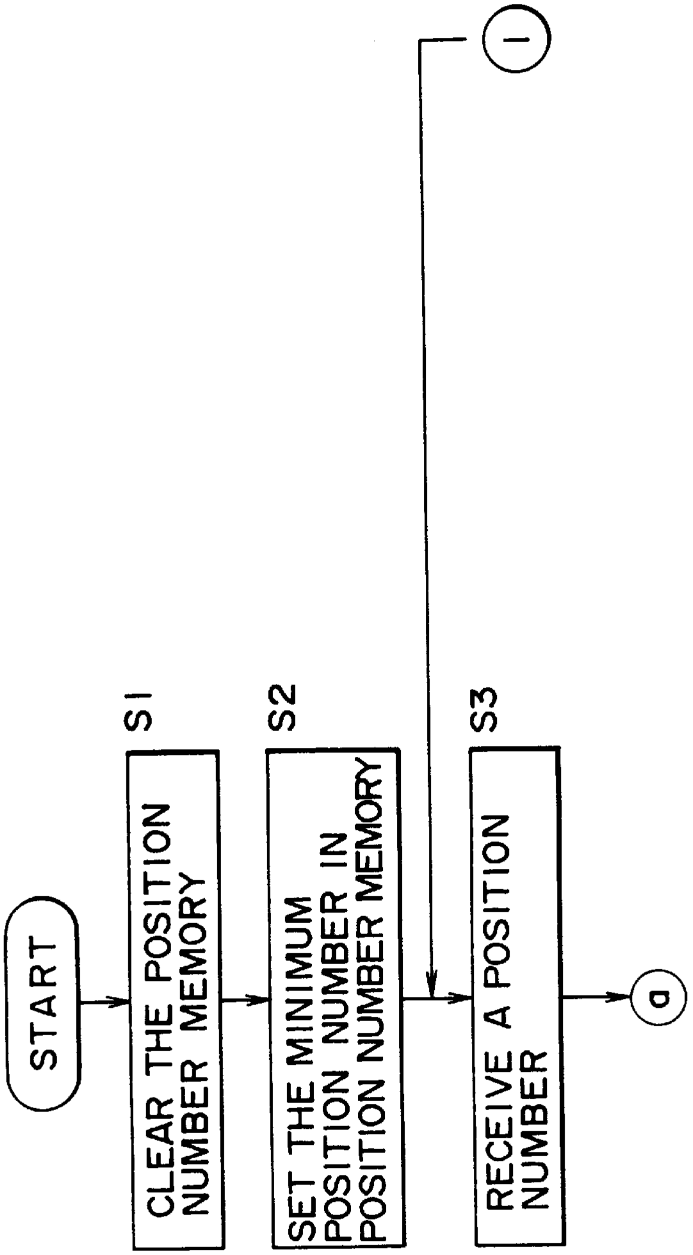

In the case that a nonvolatile memory is used as the position number memory in FIG. 1, once data necessary for time setting is recorded in the position number memory by operation of a flow shown in FIG. 2 and FIG. 3, when power supply to the television device is turned off and turned on again and then time setting to the clock is necessary, it is possible to set the time to the clock quickly using directly the data recorded in the position number memory without second operation of the flow shown in FIG. 2 and FIG. 3. The flow used in this case is shown in FIG. 10.

Figure 10A:
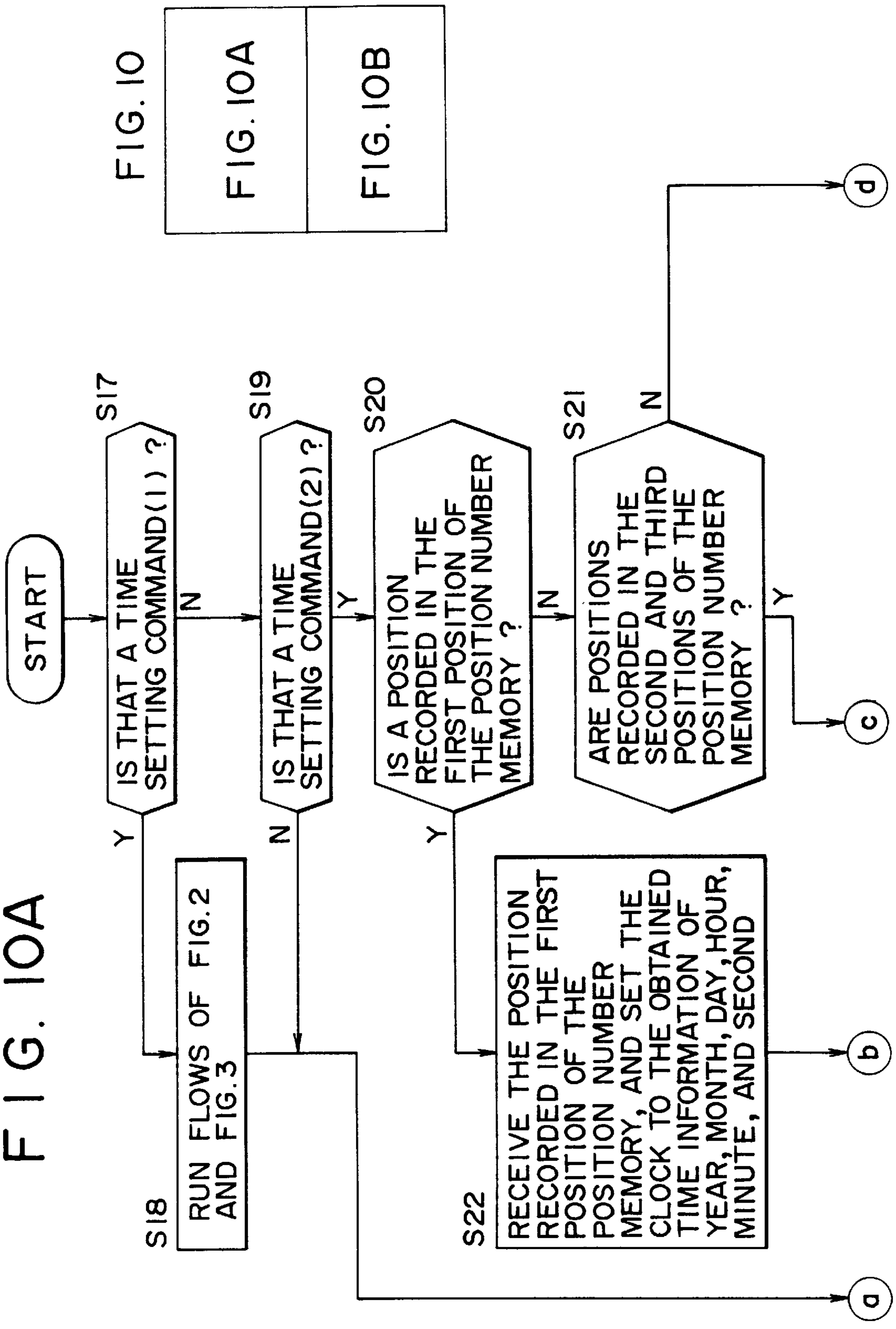
Figure 11:
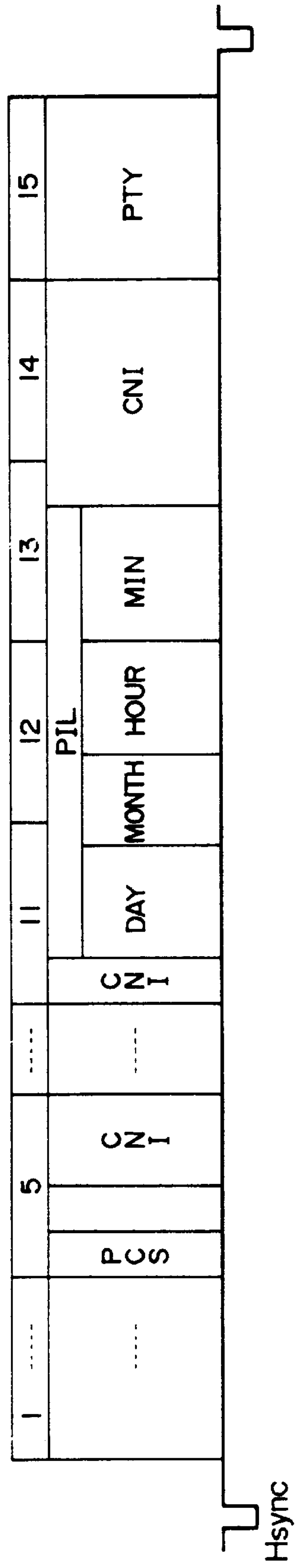
FIG. 11 is a signal format of VPS.
Figure 12:
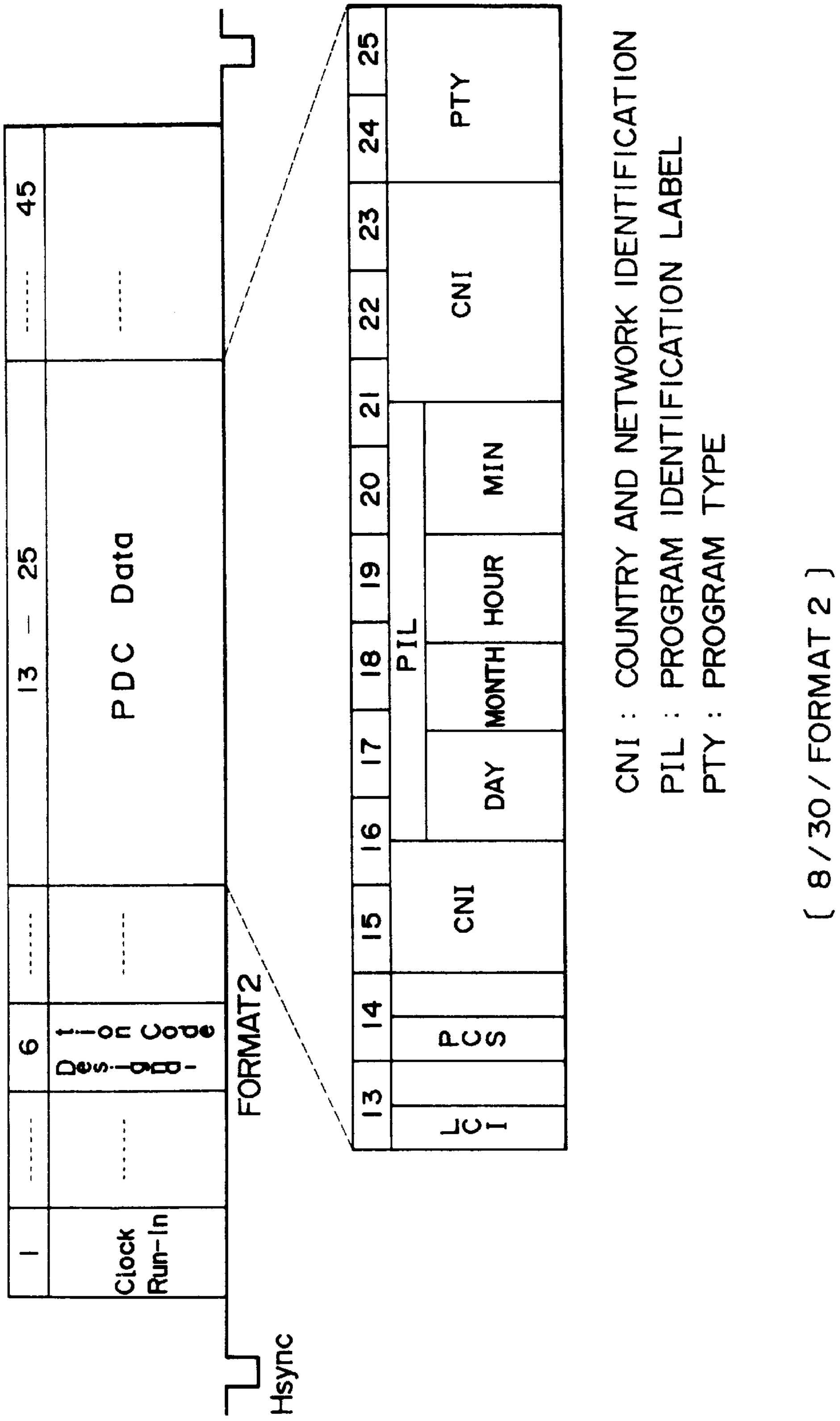
FIG. 12 is a signal format of 8/30/format 2.
Figure 13:
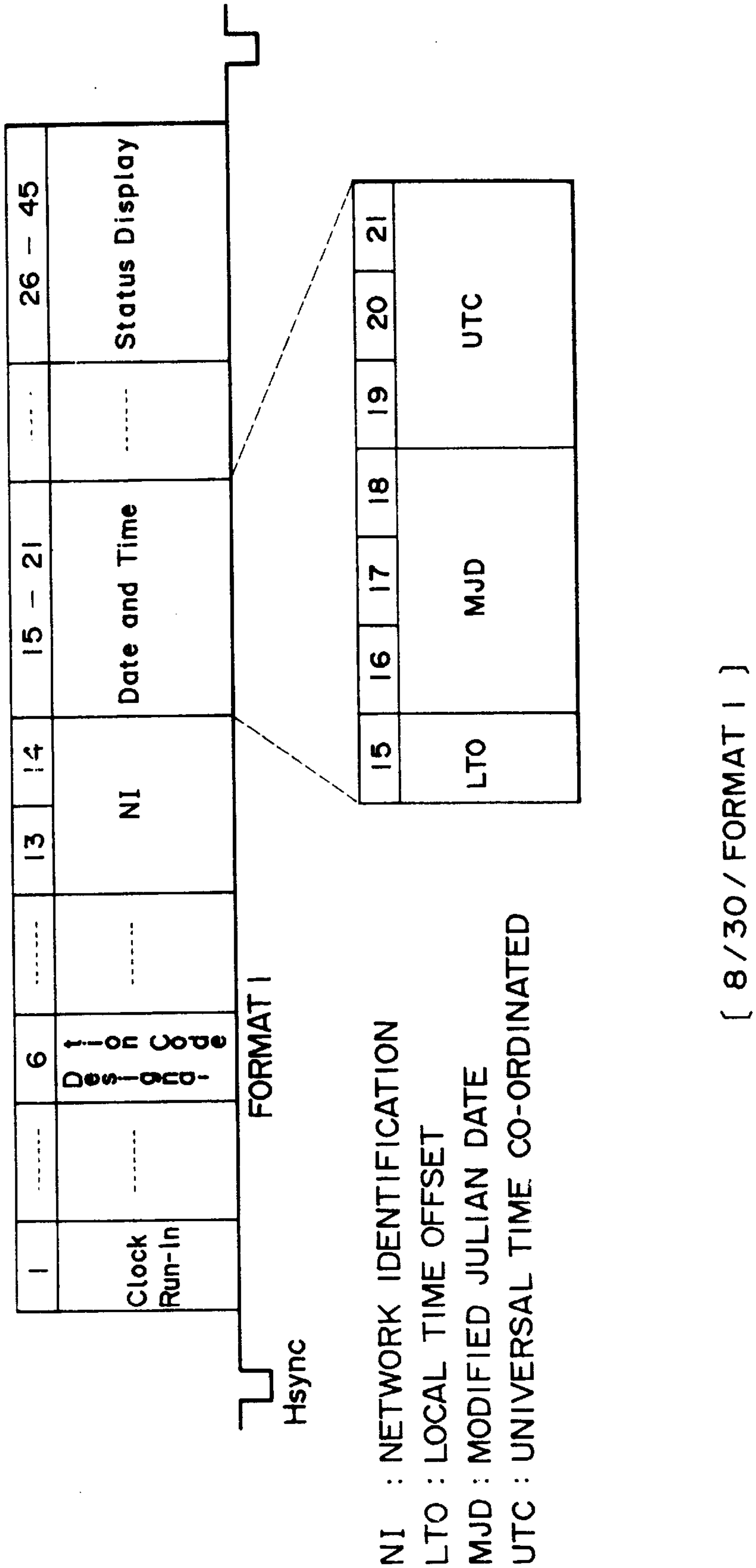
FIG. 13 is a signal format of 8/30/format 1.
Figure 14:
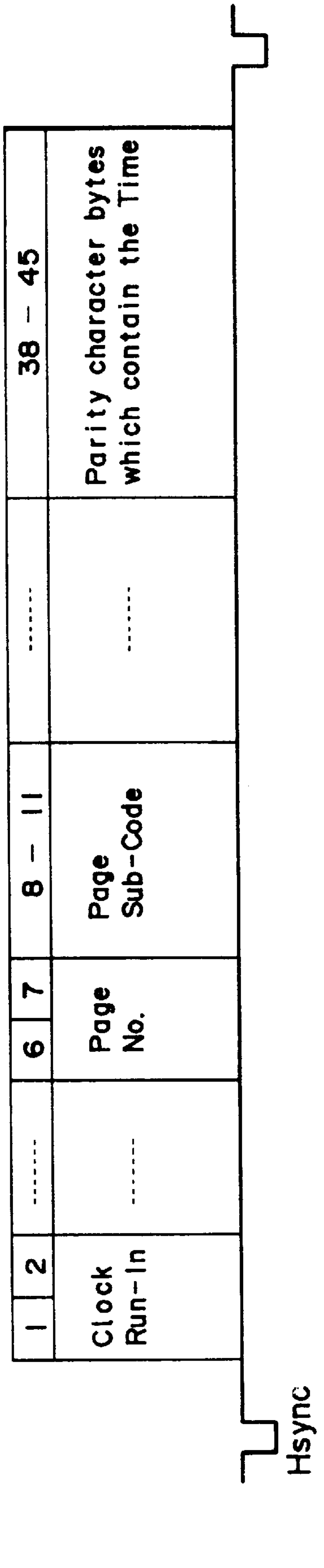
FIG. 14 is a signal format of Page-Header.

When the flow in FIG. 10 is used, two time setting commands are available for a user as time setting menu selected by a user using the remote commander. The time setting command (1) is selected when the time is set for the first time in the area where the television device is used and the time setting command (2) is selected for other cases of time setting.

Next, this flow is described. First, whether the menu selected by a user is the time setting command (1) is judged, if it is YES, the above mentioned flow shown in FIG. 2 and FIG. 3 is operated (step S18). If it is NO, whether the menu is the time setting command (2) is judged, if it is NO, the flow is finished. If it is YES, the step S20 judges whether the position number is recorded in the first position of the position number memory, then, if the position number is recorded, the step S22 set the time information comprising year, month, day, hour, minute, and second data obtained by receiving the position number to the clock.

If the step S20 judges it to be NO, whether the position number is recorded in the second and third position of the position number memory is judged, if the judgment is YES, complete time information is composed from year, month, and day data and hour, minute, and second data obtained by receiving both position numbers, then the complete time information is set to the clock (step S21 to step S25). The details of the step S25 are illustrated in FIG. 7 or FIG. 9) If the step S21 gives a judgment of NO, the step S26 displays a notice that it is impossible to set the time to the clock to the user, and the flow is finished.

If the step S21 gives a judgment of NO, the step S18 may be operated instead of the step 26.

In the television device described hereinbefore, by comparing a broadcasting station identification code interpolated in received television broadcasting signals with a broadcasting station identification code in broadcasting station tables, the device judges whether the time of the time information in this television broadcasting signals is identical with the time in the area where the television device is used, however otherwise, without using broadcasting station tables, it is judged that the broadcasting signal is a broadcasting signal of what country using the broadcasting station identification code interpolated in the received signal, thereby, whether the times are identical may be judged.

Even if the present time information interpolated in television broadcasting signals is not the time information comprising correct data on years, months, days, hours, minutes, and seconds, the time is automatically set to the clock.

The identification code of a broadcasting station which transmits the present time information correctly used to set the time to the clock is recorded in nonvolatile memory means, thereafter, the time setting is operated quickly.

What is claimed is:

1. A television device comprising:

(1) receiving means for receiving television broadcasting signals;

(2) selecting means for selecting a broadcasting signal from a plurality of television broadcasting signals received by said receiving means, said selected broadcasting signal being associated with a desired broadcasting station;

(3) extracting means for extracting a broadcasting station identification code and present time information from said selected broadcasting signal;

(4) a clock; and (5) clock setting means for setting said clock according to the present time information;

wherein, said clock setting means determines whether or not the time represented by the present time information extracted from said selected broadcasting signal is the standard time in the area where the television device is placed, and determines whether or not year, month, and day information is included in said present time information, both determinations being made by referring to said broadcasting station identification code, and both determinations being made independent of any clock that is part of said television device; and wherein said clock setting means ascertains, based on said determinations, whether or not said clock is set according to the present time information.

2. The television device as claimed in claim 1, wherein said clock setting means sets the year, month, day, hour, minute and second of said clock according to two present time information items, the first present time information item including time data corresponding to the standard time in the area where the television device is placed but not including year, month, and day information, and the second present time information item including year, month and day information but including time data that does not correspond to the standard time in the area where the television device is placed.

3. The television device as claimed in claim 1, wherein said television device is provided with memory means, and when said clock setting means determines that said clock is to be set according to the present time information, said broadcasting station identification code is stored in said memory means.

4. The television device as claimed in claim 1, wherein the present time information is associated with said selected broadcasting signal through a Teletext scheme.

* * * * *